Aug. 19, 1941.  P. E. HENNINGER  2,253,375
WELDING
Filed June 30, 1939

WITNESSES:

INVENTOR
Philip E. Henninger
BY
ATTORNEY

Patented Aug. 19, 1941

2,253,375

UNITED STATES PATENT OFFICE 2,253,375

WELDING

Philip E. Henninger, Pittsburgh, Pa., assignor to Westinghouse Electric & Manufacturing Company, East Pittsburgh, Pa., a corporation of Pennsylvania Application June 30, 1939, Serial No. 282,160
In Great Britain October 20, 1938

1 Claim. (Cl. 219—10)

My invention relates, generally, to welding, and it has reference in particular to electric resistance welding.

Heretofore where it has been desired to connect a member of relatively high conductivity having a relatively small heat capacity, such as, for example, a conductor member comprising a plurality of fine copper wires or the like, to a relatively solid body member having a relatively large heat capacity, it has been impossible to effect a direct welding thereof without burning and severing many of the fine wires of the conductor, and it has been necessary either to interpose a material of relatively high resistance between the members being welded, such as silver solder or the like, so as to provide a soldered or brazed connection rather than a welded connection, or else solder the conductor to a separate terminal member which is then riveted to the body member to which the connection is desired to be made. Such methods, while securing an electrical connection, are necessarily expensive, because of the numerous steps or operations required in their performance, and they do not readily lend themselves to commercial production methods wherein economy, speed and simplicity of operation are essential.

The object of my invention, generally stated, is to provide for securing a welded union between members of relatively high electrical conductivity having a relatively small heat capacity and body members having relatively large heat capacity, without excessive oxidation of either of the members.

A more specific object of my invention is to provide a simple and effective method for welding stranded conductor members or the like, to solid body members by applying pressure thereto by means of a high resistance electrode member in engagement with the stranded conductor member, and passing electric current therethrough to effect a welding of the stranded conductor member with the body member, while subjecting the members to a stream of water or other suitable cooling fluid in the region of the welding zone.

Another object of my invention is to provide for directly welding finely stranded copper conducting members to solid body members by utilizing a high resistance molybdenum electrode member for engaging the stranded conductor member to apply pressure thereto and generate the welding heat upon the flow of welding current therethrough to effect a welding of the conductor member with the body member, while directing a stream of water, or other suitable cooling fluid, on the zone of welding during the welding operation, to prevent burning of the fine strands of the conductor member.

Yet another object of my invention is to provide a resistance welding machine for resistance welding braided conductor body members without excessive oxidation thereof.

A further object of my invention is to provide an improved method of resistance welding members having a relatively high conductivity and a relatively small heat capacity to body members having a relatively large heat capacity, which is simple, inexpensive, and effective, and which is readily adapted to high speed methods of production.

Other objects will, in part, be obvious, and will, in part, appear hereinafter.

In practicing my invention, when it is desired to weld a member having a relatively high electrical conductivity and a relatively small heat capacity to a body member having a much greater heat capacity, as, for example, when it is desired to weld a stranded copper conductor member to a solid terminal or other body member, I have discovered that by utilizing a resistance welding machine having an electrode member of relatively high resistance formed, for example, of molybdenum or the like, for engaging the stranded conductor member so as to apply pressure to the members which are to be welded and generate the necessary welding heat upon the passage of current therethrough, and subjecting the members to a stream of water, or other suitable cooling fluid, both prior to and during the period of welding, sound welds may be secured without excessive oxidation of either of the members being welded, and without severing the fine strands of the conductor member.

For a more complete understanding of the nature and scope of my invention, reference may be had to the following detailed description taken in connection with the accompanying drawing, in which.

Figure 1:
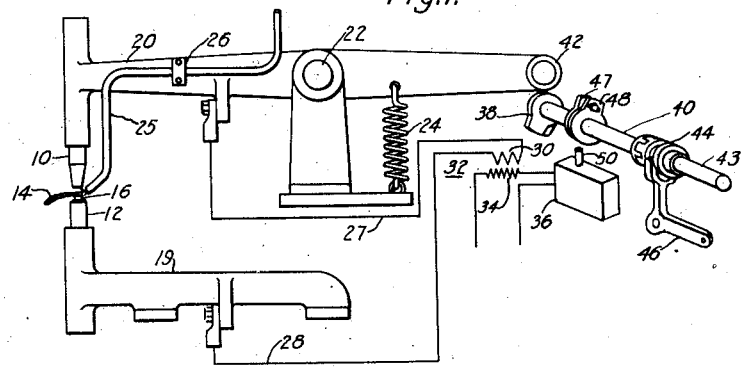
Figure 1 is a schematic view of a resistance welding system which may be utilized in practicing my invention.
Figure 4:
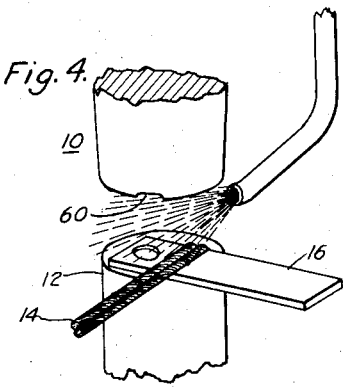
Fig. 4 is an enlarged asymmetrical view showing the arrangement of the electrode members and the members which are to be welded, prior to the performance of a welding operation.

Referring to Figs. 1 and 4 of the drawing, the reference numerals 10 and 12 may denote, respectively, the upper and lower electrode members of a resistance welding machine which may be generally of any of a type well-known in the art. The electrode members 10 and 12 may be mounted in any suitable manner, so as to be movable relative to one another for engaging the members which are to be welded together, such, for example, as the stranded conductor member 14 and the body or terminal member 16, applying pressure thereto, and conducting an electric current therethrough for effecting the welding of the said members.

The electrode members 10 and 12 may, for example, be supported by relatively movable support arms 19 and 20, the lower electrode member 12 being, for example, supported by the stationary support arm 19, while the upper electrode member 10 is supported by the movable support arm 20, which is pivotally mounted on a shaft 22, and provided with means such as the spring 24 for normally maintaining the electrode members in the disengaged position. A pipe or conduit 25 may be provided for directing a stream of water, or other suitable cooling fluid, on the members in the zone of the weld, and may, for example, be secured to the movable arm 20 by a clamp 26.

In order to provide for energizing the electrode members 10 and 12 so as to effect the passage of a welding current through the members being welded, the electrode members 10 and 12 may, for example, be connected by means of the conductors 27 and 28, respectively, to the secondary winding 30 of a transformer 32, the primary winding 34 of which may be connected to a suitable source of alternating current by means, such as the switch device 36.

Suitable means may be provided for actuating the movable support arm 20 so as to urge the electrode member 10 towards the lower electrode member 12 against the force of the spring 24. For example, a cam member 38 may be positioned on a rotatable shaft 40 so as to engage a roller 42 on the movable support arm 20 when the shaft 40 is rotated, and urge the electrode member 10 into engagement with the electrode member 12. The shaft 40 may be actuated by being operatively connected to a driven shaft 43, which may be driven by any suitable motive means, by means of a suitable clutch device 44, which may be operated by the operator through a lever mechanism, only the bell-crank 46 of which is shown.

In order to secure the best results it is desirable to provide for the energization of the electrode members 10 and 12 in accordance with the application of pressure to the members being welded. Accordingly, suitable means may be provided for effecting actuation of the switch device 36 in accordance with the actuation of the movable support arm 20. For example, a pair of relatively adjustable cam members 47 and 48 may be positioned on the rotatable shaft 40 so as to periodically engage the operating lever 50 of the switch device 36 in accordance with the rotation of the shaft 40 and thus provide for the connection of the primary winding 34 of the transformer 32 to the source of alternating current when pressure is applied to the electrode members 10 and 12. By adjusting the position of the cam member 48 relative to the cam member 47, the extent of the peripheral surface thereof for engaging the actuating lever 50 of the switch device may be varied, and the duration of closure of the switch device 36, and hence the duration of the welding period, may be adjusted to a predetermined value. The cam members 47 and 48 may also be adjustably mounted on the shaft 42 so as to enable suitable timing of the welding period in general, relative to the period of application of welding pressure.

Figure 2:
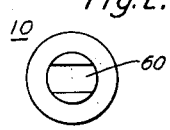
Figs. 2 and 3 are end and side elevation views, respectively, of one form of electrode member.
Figure 3:
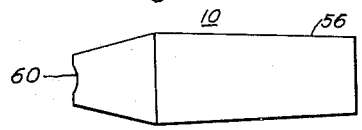

Referring to Figs. 2 and 3 of the drawing, it will be seen that the electrode member 10, which is disposed to engage the finely stranded conductor member 14 that is to be welded to the solid terminal or body member 16, may be mounted by being provided with a tapered stem portion 56 which is disposed to fit into a correspondingly shaped socket in the upper support arm 20 of the resistance welding machine. If desired, the end face of the electrode member 12 may be provided with a transverse groove 60 therein, of a depth slightly less than the thickness of the stranded conductor member 14, and so positioned that the stranded conductor member will lie therein when the electrode member 10 is brought into engagement therewith, so that the arcuate surface thereof will engage the conductor member and effect a more even distribution of the welding pressure and current between the members, so as to more evenly distribute the welding heat therebetween and secure more homogeneous welds without greatly distorting the shape of the stranded conductor.

When it is desired to weld finely stranded conductor members of copper, or the like, which have a relatively high electrical conductivity, to a terminal or other relatively solid body member, I have found that it is not only essential to use an electrode member 10 having a relatively high electrical resistance for engaging the stranded conductor members, so that a large portion of the welding heat will be generated in the electrode member itself, but that it is also necessary to subject the members being welded to a cooling medium such as, for example, a stream of water or some other fluid, in the zone of the weld, in order to cool the fine strands of the conductor and secure sound welds without burning or otherwise severing the fine strands of the conductor. It is preferable that the cooling fluid be applied to the parts to be welded before they are engaged by the electrodes.

In order to withstand the extreme heating and cooling conditions to which a high resistance electrode member is subjected during such a welding process, when the stream of water or other fluid plays upon portions of the heated electrode member, or it otherwise comes into contact therewith, it is desirable that the electrode member 10 not only be formed from a material having a relatively high electrical resistance but that it also have a relatively high melting point, a high degree of hardness, and be sufficiently tough to withstand sudden changes of temperature without chipping or cracking. In this respect I have found that an electrode member composed of molybdenum powders, which may be compacted under high pressure and sintered by the passage of an electric current therethrough so as to form an integral homogeneous body of high density, will not crack or chip, and performs exceptionally well under the heating and cooling conditions encountered in welding finely stranded shunt members to solid body members while subjecting these parts to a stream of water or other fluid.

In accordance with my invention, when welding a finely stranded copper conductor member, or the like, to a terminal or other relatively solid body member of similar nature, the members may be positioned between the welding electrodes where they will be subjected to a stream of fluid, such as water, or the like, both prior to and during the welding process. Pressure may then be applied to the members being welded by actuation of the clutch device 44, so that the shaft 40 is operatively connected to the driven shaft 43, and the cam member 38 is rotated to engage the roller 42 (of the movable support arm 20). In practice, a total pressure of the order of 250 to 450 pounds at the electrode members has been found to give excellent results.

The switch device 36 is operated by the cam members 47 and 48 in timed relation with the actuation of the movable support arm 20, to effect energization of the electrode members 10 and 12 from the transformer 32 for a predetermined interval of time, as determined by the adjustment of the cam members 47 and 48. Welding heat is applied to the conductor member 14 and the terminal member 16, both by the passage of the current therethrough, and by the internal heat generated in the high resistance electrode member 10, which is in engagement with the conductor member 14, so as to effect a fusion of the conductor member and the terminal member. By the application of a suitable amount of water or other suitable fluid through the pipe or conduit 25 to the members being welded, both prior to and during the welding period, I have found that a sound weld between the conductor member 14 and the terminal member 16 may be secured without excessive oxidation of either of the members, and without any severance of the fine strands of the conductor member, without requiring accurate control of the duration of the welding period.

From the above description, taken in connection with the accompanying drawing, it will be apparent that by practicing my invention, sound welds may be secured between finely stranded conductor members and the like, and solid body members, in a simple and effective manner which readily lends itself to high speed production methods. Many thousands of such welds have been made commercially with absolute satisfaction, and much time and expense has been saved over the methods heretofore practiced in attaching stranded conductor members to body members, which required the interposing of high resistance materials between the stranded conductor member and the body member, or the use of separate terminal members which could be soldered to the conductor member and then riveted to the body member to which connection was desired to be made.

It is to be understood that my welding method may be practiced by the use of any suitable resistance welding machine, the particular machine shown in Fig. 1 being merely illustrative of one general type which may be used.

Since certain changes may be made in the above description, and different embodiments of the invention may be made without departing from the spirit thereof, it is intended that all the matter contained in the above description, or shown in the accompanying drawing, shall be considered as illustrative, and not in a limiting sense.

I claim as my invention:

A method of spot welding a cuprous conductor of a plurality of relatively fine strands to a solid body member comprising the steps of placing the stranded conductor on the body member in welding position, generating the principal welding heat externally with respect to the stranded conductor by passing a relatively large electric current through a relatively high resistance molybdenum electrode member in engagement with said stranded conductor at the welding zone, conducting the current from the body member without generating any appreciable external heat adjacent the body member by passing the current through a relatively low resistance electrode member in engagement with said body member, applying pressure to the electrode members, and applying a cooling fluid to the conductor and body member adjacent the zone of welding to localize the fusion of the stranded conductor to said zone.

PHILIP E. HENNINGER.